United States Patent [19]

Izumi et al.

[11] 4,400,343
[45] Aug. 23, 1983

[54] SYSTEM AND METHOD FOR CONTROLLING OPERATION OF BOILING WATER REACTOR

[75] Inventors: Masayuki Izumi; Renzo Takeda, both of Hitachi, Japan

[73] Assignee: Hitachi, Ltd., Tokyo, Japan

[21] Appl. No.: 85,686

[22] Filed: Oct. 17, 1979

[30] Foreign Application Priority Data

Oct. 18, 1978 [JP] Japan ................................ 53-127999
Sep. 19, 1979 [JP] Japan ................................ 54-119372

[51] Int. Cl.³ .............................................. G21C 7/32
[52] U.S. Cl. ................................... 376/417; 376/210; 376/379; 376/214
[58] Field of Search ................. 176/20, 24, 50, 54–56; 376/207, 210, 214, 244, 216, 217, 370, 379

[56] References Cited

U.S. PATENT DOCUMENTS

| | | | |
|---|---|---|---|
| 2,873,242 | 2/1939 | Treshow | 376/244 |
| 3,029,197 | 4/1962 | Untermeyer | 176/55 |
| 3,061,533 | 10/1962 | Shannon et al. | 176/56 |
| 3,144,393 | 8/1964 | Raber et al. | 176/54 |
| 3,150,052 | 9/1964 | Stoker et al. | 176/56 |
| 3,276,965 | 10/1966 | Leyse et al. | 176/20 R |
| 3,467,577 | 9/1969 | Winkler | 376/244 |
| 3,575,807 | 4/1971 | Ripley | 176/20 R |
| 3,630,839 | 12/1971 | Podolsky | 176/20 R |
| 3,700,552 | 10/1972 | Schluderberg | 176/20 R |
| 4,108,720 | 8/1978 | Sato et al. | 176/54 |

FOREIGN PATENT DOCUMENTS

| | | | |
|---|---|---|---|
| 2800552 | 7/1978 | Fed. Rep. of Germany | 176/24 |
| 51-10294 | 1/1976 | Japan | 176/20 R |
| 52-37695 | 3/1977 | Japan | 176/20 R |
| 52-3996 | 12/1977 | Japan | 176/20 R |

OTHER PUBLICATIONS

A Design Description of Dresden Nuclear Power Station, (11/26/56), pp. 1–25.

*Primary Examiner*—Sal Cangialosi
*Attorney, Agent, or Firm*—Antonelli, Terry & Wands

[57] ABSTRACT

The pressure $P_R$ in the reactor pressure vessel, the flow rate $W_c$ of the cooling water flowing through the core in the reactor pressure vessel, and the flow rate $W_{STM}$ of the steam supplied from the reactor pressure vessel to the turbine are detected. The enthalpy $H_f$ of the saturated cooling water is determined on the basis of the pressure $P_R$. The values of the cooling water flow rate $W_c$, the steam flow rate $W_{STM}$, the enthalpy $H_f$ of the saturated cooling water and a predetermined enthalpy $H_{IN}$ of the cooling water at the core inlet are substituted into the equation below thereby to obtain the enthalpy $H_{fw}$ of the feed water.

$$H_{fw} = H_f\left(1 - \frac{W_c}{W_{STM}}\right) + H_{IN}\left(\frac{W_c}{W_{STM}}\right)$$

An error is determined between the feed-water enthalpy $H_{fw}$ thus obtained and the enthalpy $T_{fw}$ of the feed water actually supplied into the reactor pressure vessel, and on the basis of this error, the opening of the flow rate control valve on the turbine bleeding pipe is adjusted, so that the flow rate of the steam bled from the turbine for heating the feed water is adjusted according to the error.

22 Claims, 15 Drawing Figures

AXIAL POSITION WITH RESPECT TO CORE LOWER END

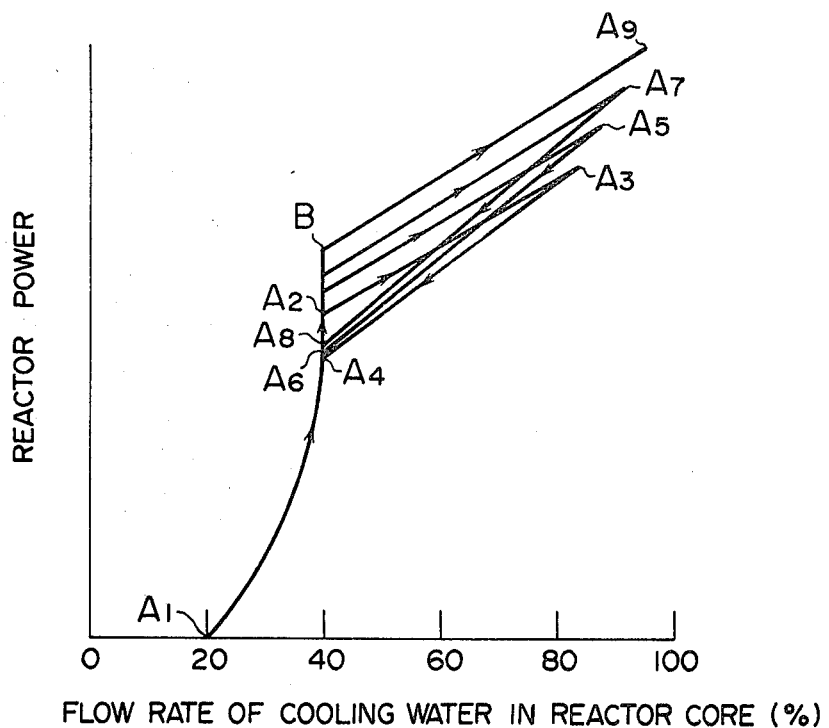
FIG. I
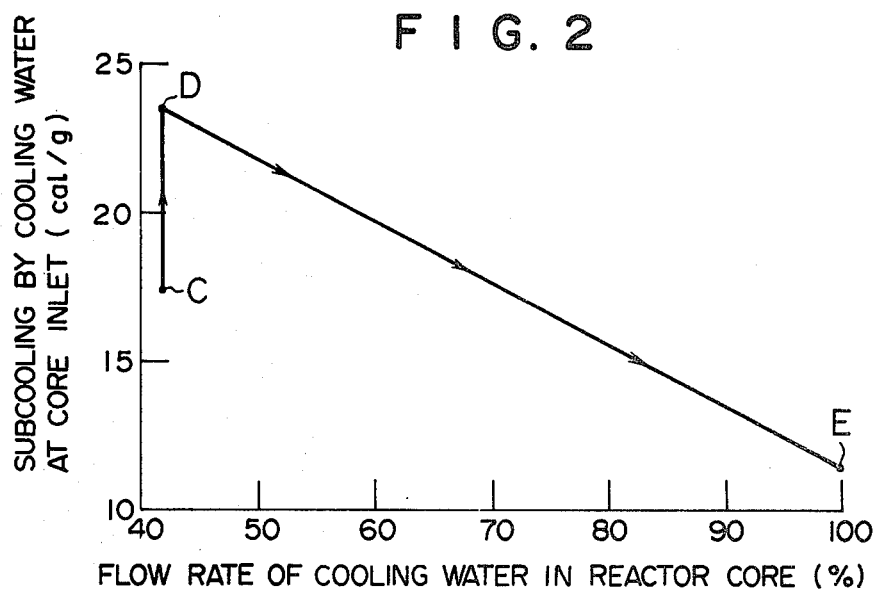
FIG. 2

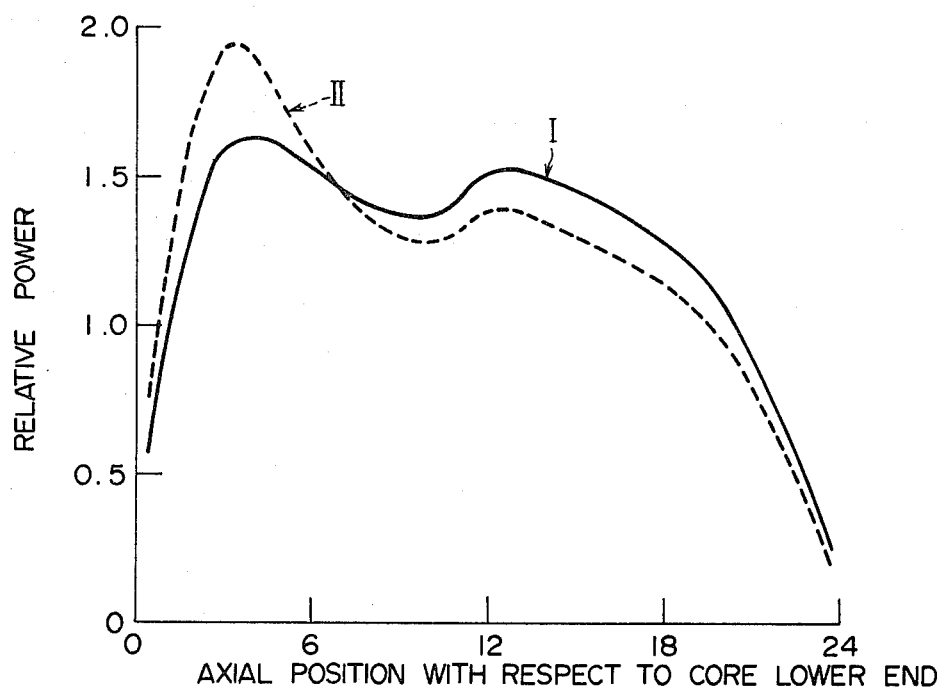
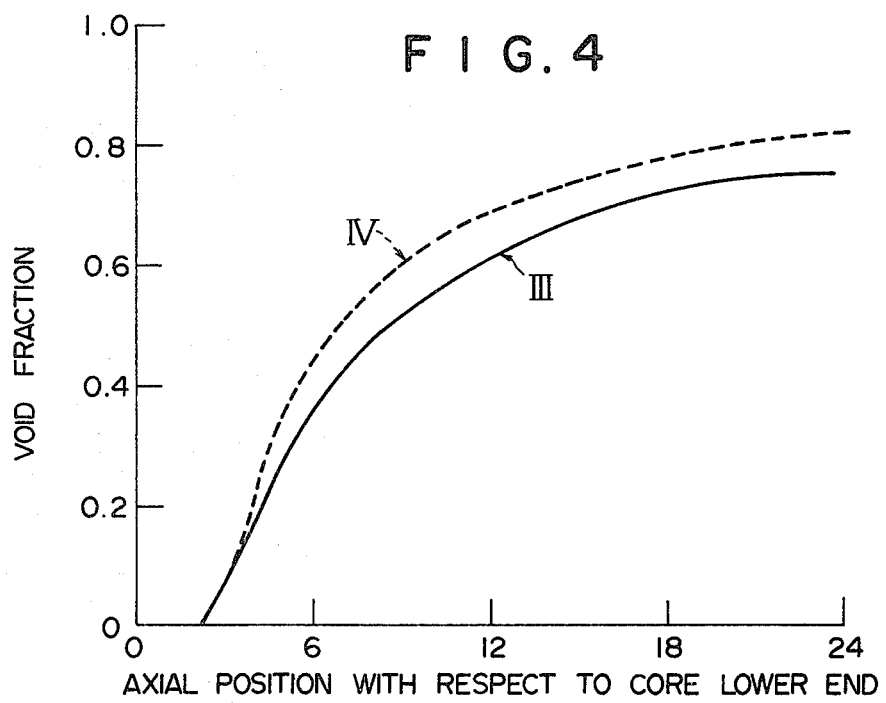

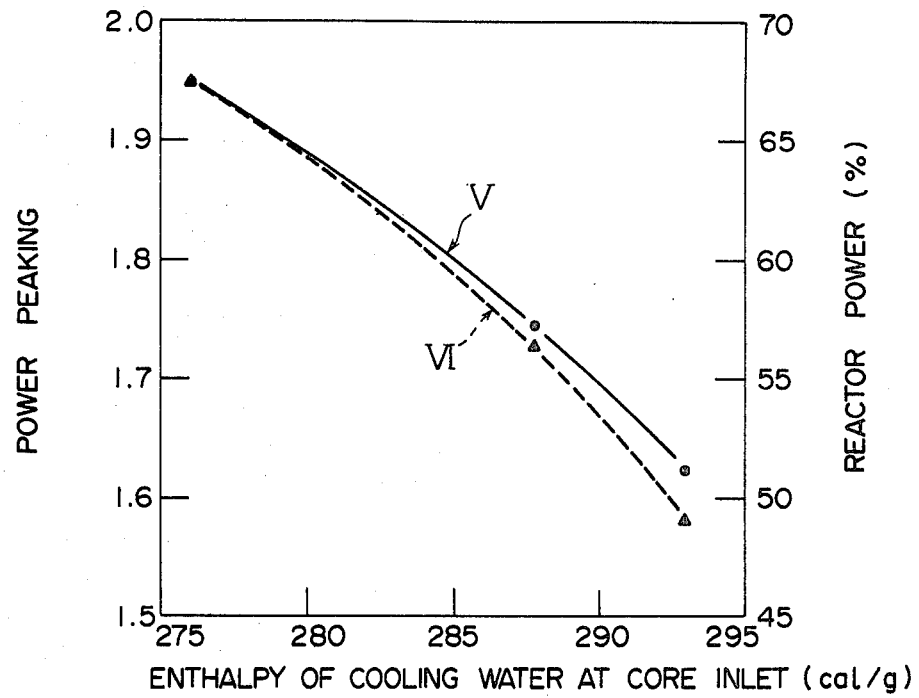
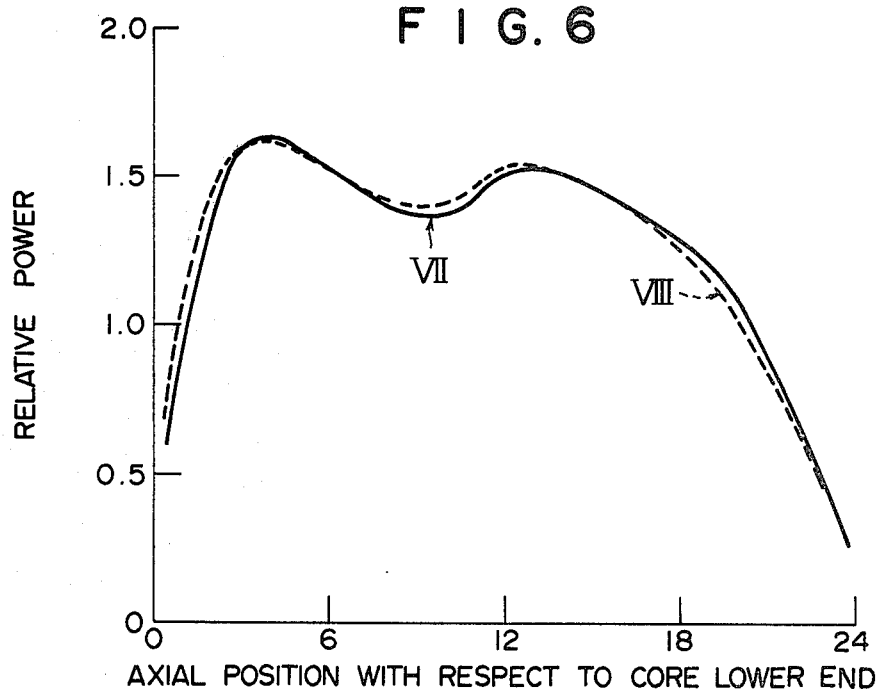

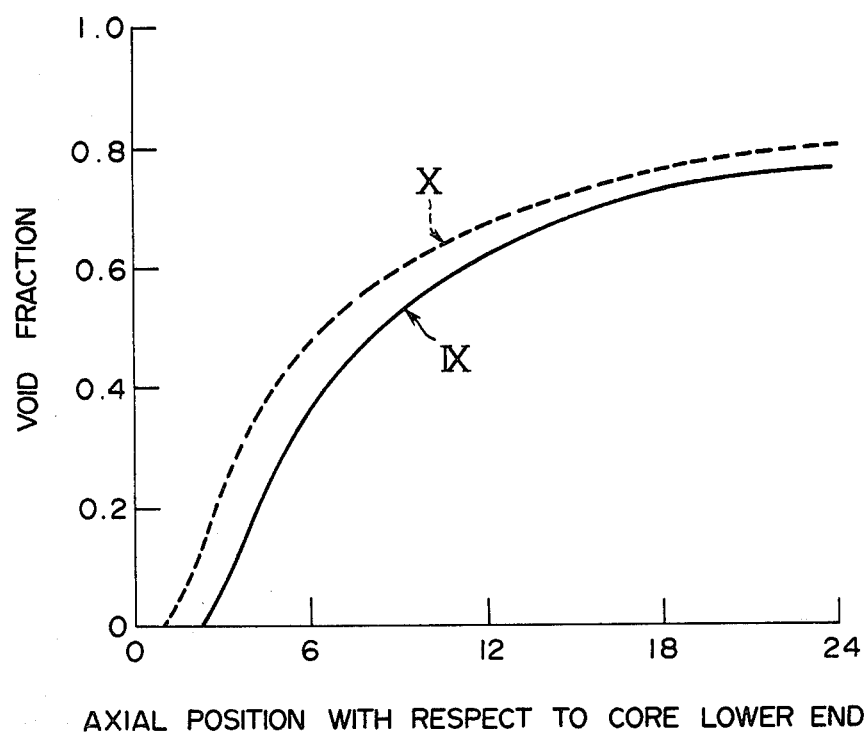

F I G. 12
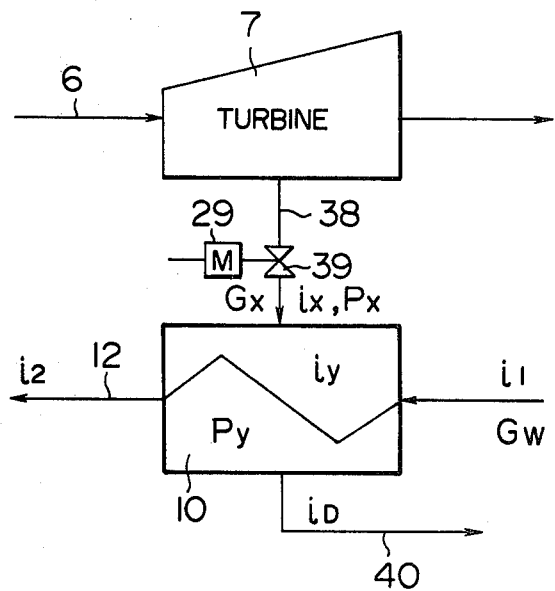

F I G. 15
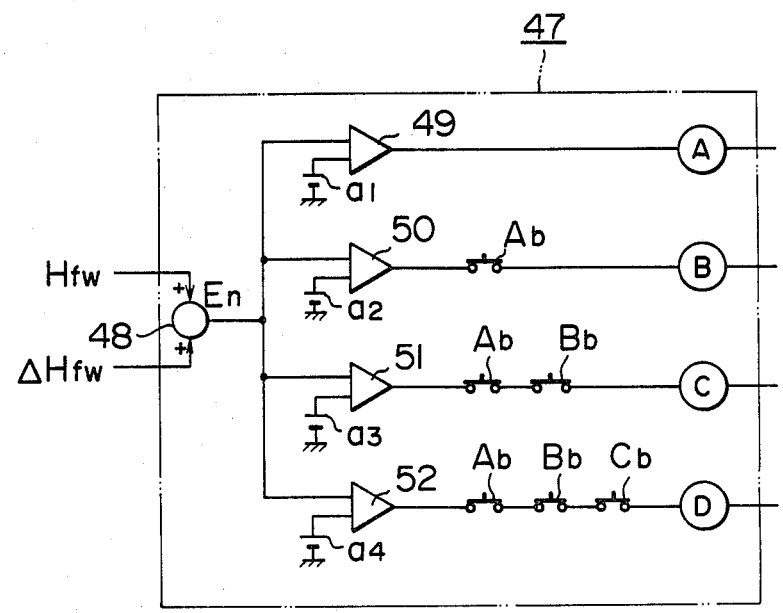

SYSTEM AND METHOD FOR CONTROLLING OPERATION OF BOILING WATER REACTOR

BACKGROUND OF THE INVENTION

The present invention relates to system and method for controlling the operation of the boiling water reactor, or more in particular to those for controlling the power distribution thereof.

The boiling water reactor directly supplies the turbine with steam generated within the reactor pressure vessel. A dynamo is connected to the turbine. The reactor pressure vessel contains a core loaded with a multiplicity of fuel assemblies. The cooling water is supplied into the core from the lower side of the core and while being fed upward within the core, cools the fuel rods in the fuel assemblies to be heated to become steam. This steam is supplied to the turbine from the reactor pressure vessel through a steam separator and a dryer at the upper part of the core. After imparting the turning effort to the turbine, the steam is discharged from the turbine and condensed at the condenser. The resulting condensed water is heated at the feed-water heater by the steam bled from the turbine, and is fed through the jet pump in the pressure vessel of the reactor back to the reactor core.

Generally, the nuclear reactor is designed to attain a flat power distribution of the core in order to maintain the soundness of the fuel rods. In the boiling water reactor plant, however, the conditions of bleeding steam from the turbine are different between under the rated power state and under the partial power state. Under the partial power state such as at a start-up time when the flow rate and the power are both low, therefore, the heat balance causes the sub-cooling at the core inlet to be increased as compared with that under the rated power state, thus increasing the power peaking at the lower part of the core. It has been experimentally ascertained that the threshold value for increasing the power by withdrawing the control rods from the reactor core while maintaining the soundness of the fuel rods by preventing them from being damaged is 8 kw/ft in terms of linear heat generation rate. The power increase at a linear heat generation rate of 8 kw/ft or more is effected by increasing the flow rate of the cooling water flowing in the core. At the time of reactor start-up, the power peaking at the lower part of the core increases and therefore the linear heat generation rate may exceed 8 kw/ft. For this reason, in the case where the power is increased by withdrawing the control rods from the core at the start-up time, further withdrawal of the control rods has to be stopped at the time point when the highest point of the power peaking at the lower part of the core reaches 8 kw/ft. Subsequently, as disclosed in U.S. patent application Ser. No. 762,248 filed Jan. 25, 1977 (corresponding to Japanese Patent Application Laid-Open No. 141990/76), the flow rate of the cooling water in the core is increased to attain a desired value of the linear heat generation rate, and thus xenon which is a fission product is accumulated in the fuel rods, so that the flow rate of the cooling water is reduced thereby to reduce the power. In the presence of xenon thus accumulated, the control rods are withdrawn from the reactor core, thus increasing the linear heat generation rate up to 8 kw/ft again. In other words, the sequence of the operation K-L-M-K described in U.S. patent application Ser. No. 762,248 filed Jan. 25, 1977 is repeated. As mentioned above, if the power peaking is large at the lower part of the core, the withdrawal rate of the control rods is reduced and the number of cycles of the operation K-L-M-K necessary for increasing the power of the reactor to the rated value will be increased. This considerably complicates the operation for increasing the power at reactor start-up, thus requiring a long time until the rated power is attained. As a result, the utility of the boiling water reactor is decreased.

SUMMARY OF THE INVENTION

Accordingly, it is an object of the present invention to improve the utility of the boiling water reactor.

Another object of the invention is to shorten the time required for boiling water reactor start-up.

Still another object of the invention is to prevent the reduction in turbine efficiency.

According to an aspect of the present invention, there is provided a system for controlling the operation of the boiling water reactor, comprising first detector means for detecting the pressure within the reactor pressure vessel, second detector means for detecting the flow rate of the cooling water flowing in the reactor core within the reactor pressure vessel, third detector means for detecting the flow rate of the steam supplied from the reactor pressure vessel to the turbine, means for setting the enthalpy of the cooling water at the core inlet, and means for adjusting the enthalpy of the water supplied to the reactor vessel, the feedwater enthalpy adjusting means being controlled on the basis of the pressure, the flow rate of the cooling water and the steam flow rate detected by the first, second and third detector means respectively and the enthalpy of the cooling water set by the setting means.

BRIEF DESCRIPTION OF THE DRAWINGS

FIG. 1 is a characteristics diagram showing the processes of increasing the reactor power at the start-up time in terms of the relation between the cooling water flow rate in the core and the reactor power.

FIG. 2 is a characteristics diagram showing the relation between the flow rate of the cooling water in the core and the subcooling of the cooling water at the core inlet.

FIG. 3 is a characteristics diagram showing the axial relative power distribution in the core in the conventional system for operation control of the boiling water reactor.

FIG. 4 is a characteristics diagram showing the distribution of the axial void fraction of the core according to the conventional system of operation control.

FIG. 5 is a characteristics diagram showing the relation between the enthalpy of the cooling water at the core inlet under partial power state of the boiling water reactor, power peaking and the power of the same reactor.

FIG. 6 is a characteristics diagram showing the axial relative power distribution of the core according to the method of operation control of boiling water reactor of the present invention.

FIG. 7 is a characteristics diagram showing the axial void fraction distribution of the core in the method of operation control of the boiling water reactor according to the present invention.

FIG. 12 is a schematic diagram for explaining the heat balance of the feet-water heater shown in FIG. 8.

FIG. 15 is a diagram showing the construction of the valve control included in FIG. 14.

DESCRIPTION OF THE PREFERRED EMBODIMENTS

Figure 8:
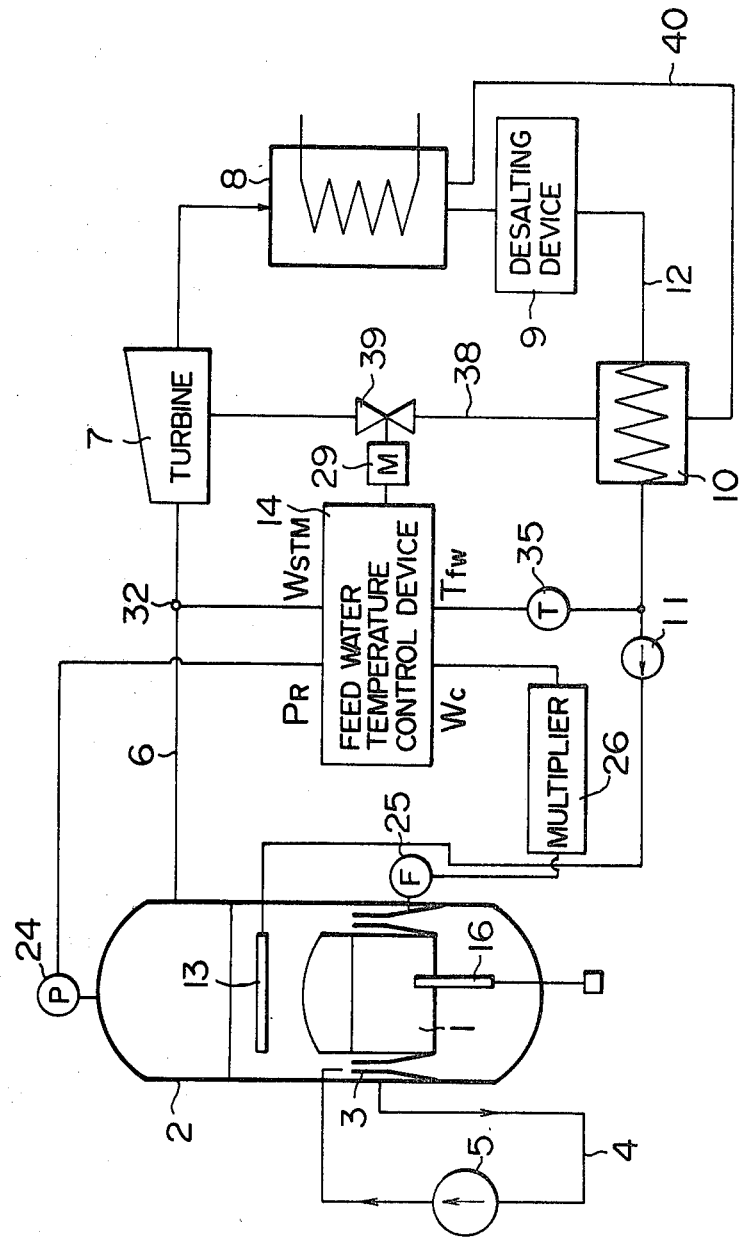
FIG. 8 is a diagram showing a system of the boiling water reactor plant to which a preferred embodiment of the present invention is applied.

Detailed explanation will be made below of the characteristics of the core of the boiling water reactor operated according to the conventional method of control.

First, detailed study made by the present inventors on the change in the reactor power at the time of the start-up of the boiling water reactor will be explained with reference to FIG. 1. When the control rods are withdrawn from the core with a flow rate in the core maintained at 20%, the reactor power begins to increase from point $A_1$. When the reactor power reaches $A_2$, the withdrawal of the control rods is stopped. The point $A_2$ represents a reactor power corresponding to a linear heat generation rate of 8 kw/ft of the fuel rods loaded in the core. If the reactor power is increased beyond point $A_2$ by further withdrawing the control rods, the fuel rods are more likely to be damaged. After the withdrawal of the control rods is stopped, the flow rate of the cooling water flowing in the core is increased, so that the reactor power increases along line $A_2$-$A_3$. This increase of the reactor power from point $A_2$ to point $A_3$ should be achieved at a speed lower than the critical power increase speed at which and at higher speeds the fuel rods will be damaged, as described in U.S. Pat. No. 4,057,466, for example. When reactor power reaches $A_3$, the flow rate of the cooling water is reduced. The reactor power decreases to point $A_4$ for the reason disclosed in U.S. patent application Ser. No. 762,248, filed Jan. 25, 1977 i.e., because xenon is produced within the fuel rods. In the presence of xenon, the control rods are withdrawn to increase the reactor power from point $A_4$ to point $A_2$. When reactor power reaches point $A_2$, the withdrawal of the control rods is stopped. The reactor power subsequently gradually increases with extinction of xenon. The reactor power is increased up to point $A_5$ by increasing the flow rate of the cooling water. After that, the steps of reducing the flow rate of the cooling water, withdrawal of the control rods, stoppage of withdrawal of the control rods, and increasing the flow rate of the cooling water are repeated. As a result, the reactor power changes through points $A_5$-$A_6$-$A_2$-$A_7$-$A_8$-$A_2$-$A_9$, thus permitting the reactor power to be increased up to 100% of the rated power (point $A_9$).

In the boiling water reactor whose power is increased up to 100% from 0% by the above-mentioned process of operation, the conditions of bleeding steam from the turbine under the reactor power state such as 100% is different from those under a partial power state such as 67.4%, resulting in different flow rates, enthalpies and pressures of the plant parts as shown in Table 1 below, which shows values for the plant parts under the rated power state and a partial power state of the boiling water reactor having the power density of 50 kw/l. Specifically, under the partial power state such as at the start-up (where both the flow rate and power are low), the subcooling of the cooling water at the core inlet (hereinafter referred to merely as the subcooling) is increased as compared with that under the rated power state for the reason of heat balance, thus increasing the power peaking at the lower part of the core. As a result, as shown in Table 1, in the boiling water reactor having the core inlet subcooling of 11.4 cal/g under the rated power state, the subcooling at the core inlet under the partial power state where the reactor power is 67.4% and the flow rate at the core is 40% (point B in FIG. 1) is 23.4 cal/g.

TABLE 1

| Item | Reactor Rated Power | Reactor Partial Power |
|---|---|---|
| Reactor power (%) | 100 | 67.4 |
| Flow rate of cooling water in reactor core (%) | 100 | 40.0 |
| Flow rate of cooling water in reactor core (t/h) | 35600 | 14240 |
| Enthalpy of cooling water at core inlet (cal/g) | 293 | 276 |
| Subcooling of cooling water at core inlet (cal/g) | 11.4 | 23.4 |
| Dome pressure (Kg/cm$^2$ · a) | 71.7 | 68.9 |
| Enthalpy of saturated water (cal/g) | 304 | 300 |
| Enthalpy of feedwater (cal/g) | 221 | 191 |
| Feed-water flow rate (t/h) | 4650 | 3130 |
| Steam flow rate (t/h) | 4670 | 3150 |

The change in subcooling at core inlet with respect to the flow rate of the cooling water in the core is briefly shown in FIG. 2. In the section between C and D, the reactor power is increased due to the withdrawal of the control rods, and in the section between D and E, the reactor power is increased due to an increased flow rate of the cooling water in the reactor core. With the increase in the flow rate of the cooling water and the resulting increase in the reactor power, the subcooling at the core inlet is reduced.

FIGS. 3 and 4 show the power distribution and the void fraction respectively under the rated power state and the partial power state for the same control rod pattern. In these drawings, the abscissa represents an axial position with respect to the core (0 and 24 represent the lower and upper ends of the core respectively), and the ordinate represents the relative power in FIG. 3 and the void fraction in FIG. 4. The characteristics I and II in FIG. 2 represent the relative power under the rated power state and the partial power state of the reactor, respectively. The characteristics III and IV in FIG. 4 represent, on the other hand, the void fractions under rated power state and partial power state of the reactor, respectively. It is seen from FIG. 3 that the power peaking under the rated power state is 1.63 while the power peaking under the partial power state is 1.95. Thus, the power peaking under the partial power state is approximately 20% larger than that under rated power state. As described above, under the partial power state of the nuclear reactor, the subcooling at the core inlet is large and therefore, as shown in FIG. 4, the void fraction at the upper part of the core increases more than under the rated power state, while the void fraction at the upper part of the core at or about the boiling starting point substantially remains unchanged between under the partial and rated power states of the reactor. In the boiling water reactor, an increase in void fraction reduces the power of the reactor. Therefore, only the power at the upper part of the core decreases, thus increasing the power peaking at the lower part of the core relatively.

The threshold value for increasing the power by withdrawing the control rods from the core while maintaining the soundness of the fuel rods is 8 kw/ft in terms of the linear heat generation rate, as already mentioned above. Under a partial power state (reactor power of 67.4% and flow rate in the core 40%) of the boiling water reactor having a power density of 50 kw/l, the linear heat generation rate corresponding to a power peaking of 1.95 at the lower part of the core is 8.2 kw/ft, which exceeds the threshold value for withdrawal of the control rods, which makes the processes for increasing the reactor power up to the rated value complicated. The result is a longer time length for increasing the reactor power, thus leading to a poor utility of the boiling water reactor.

Study was made from various angles to reduce the power peaking at the lower part of the core under the partial load state at the time of the start-up of the reactor. As a result, it has been found that by controlling the enthalpy of the cooling water at the core inlet (hereinafter referred to as the enthalpy), namely, the subcooling at the core inlet, a flat axial power distribution can be attained even under the partial power state of the reactor as mentioned below.

FIG. 5 shows the change in the reactor power and power peaking in accordance with the change in the enthalpy at the core inlet under the partial power state (40% flow rate in the core) of the boiling water reactor plant having a power density of 50 kw/l. In this graph, the abscissa represents the enthalpy at the core inlet (cal/g), and the ordinate the power peaking and reactor power (%). The characteristics curves V and VI represent the power peaking and reactor power, respectively. The enthalpy at the core inlet under the partial power state of the conventional boiling water reactor plant is 276 cal/g. With the increase in the enthalpy at the core inlet, the subcooling at the core inlet decreases, so that the boiling start point transfers to the lower end of the core, thus greatly increasing the void fraction at the lower part of the core. However, the void fraction at the upper part of the core undergoes only a small change. As a result, the power rate at the lower part of the core is decreased to reduce the power peaking under the partial power state of the reactor. With the increase in the enthalpy at the core inlet, the average void fraction at the core increases to reduce the reactor power. If the enthalpy at the core inlet under the partial power state is the same 293 cal/g as under the rated power state, the power peaking is 1.62 and the reactor power 49.1%. Thus, the power peaking under the partial power state is reduced to 83% of that of the conventional boiling water reactor plant, and the reactor power to 73% of that of the conventional boiling water reactor plant, so that the power peaking is almost the same as under the rated power state. In this case, the linear heat generation rate is 5.8 kw/ft, which is about 71% of that for the conventional boiling water reactor plant.

FIG. 6 shows a comparison of the power distribution between under the rated power and partial power state (40% flow rate of the cooling water at core) for the same control rod pattern and the same enthalpy at the core inlet (293 cal/g). The abscissa in the drawing represents an axial position with respect to the lower end of the core (0 and 24 corresponding to the lower and upper ends of the core respectively), and the ordinate the relative power. The characteristics curves VII and VIII respectively show the relative powers under the rated power state and partial power state. This drawing shows that the power distribution for both the curves agree well with each other as mentioned above. FIG. 7 shows a similar comparison of the void fraction, in which the ordinate represents the void fraction. The characteristics curves IX and X represent the void fractions under the rated power state and partial power state of the reactor respectively under the same condition as in FIG. 5. Specifically, at the lower part of the core in the vicinity of the boiling start point under the partial power state of the reactor, the void fraction is higher by about 15% than under the rated power state of the reactor. At the upper part of the core, on the other hand, the void fraction under the partial power state increases by about 5%. Under the partial power state, this void fraction distribution flattens the power distribution.

Therefore, by controlling the enthalpy at the core inlet, the axial power distribution at the core can be flattened under such a partial power state as at the time of start-up. Also, since the treactor power decreases, the linear heat generation rate is greatly reduced, which leads to a greater margin for the threshold value for withdrawal of the control rods. As a result, the procedures for starting up the reactor are simplified, while at the same time shortening the time required before attaining the rated power.

The enthalpy at the core inlet can be determined by the equation below in view of the heat balance of the boiling water reactor:

$$H_{IN} = H_f\left(1 - \frac{W_{STM}}{W_c}\right) + H_{fw}\left(\frac{W_{STM}}{W_c}\right) \tag{1}$$

where $H_{IN}$ denotes the enthalpy at the core inlet in cal/g, $H_f$ the enthalpy of the saturated cooling water in cal/g, $W_{STM}$ the steam flow rate supplied to the turbine in t/h, $W_c$ the flow rate of the cooling water at core in t/h, and $H_{fw}$ the enthalpy of the feed water, i.e., the cooling water supplied into the reactor pressure vessel in cal/g.

Considering the heat balance of the boiling water reactor in detail, equation (1) should contain the steam carryunder ratio, the heat amount supplied from the control rod drive means, the heat amount lost in the purification system, the heat amount supplied from the recirculation pump, and the heat amount escaping by way of the wall of the reactor pressure vessel. However, these values are negligibly small. The enthalpy of the saturated cooling water (hereinafter referred to merely as the saturated water) depends on the dome pressure of the reactor pressure vessel, while the steam flow rate is dependent on the reactor power. The flow rate of the cooling water in the core is adapted to be manually changed to change the reactor power. Thus, in order to control the enthalpy at the core inlet, the feed water enthalpy is controlled. The enthalpy of the feed water is given by converting the equation (1) as below.

$$H_{fw} = H_f\left(1 - \frac{W_c}{W_{STM}}\right) + H_{IN}\left(\frac{W_c}{W_{STM}}\right) \qquad (2)$$

Measurements of the boiling water reactor plant may be used as the flow rate of the cooling water in the core and the steam flow rate. The enthalpy of the saturated water is determined by the measurement of dome pressure of the reactor pressure vessel and the steam table. When the enthalpy for the core inlet is set by the use of equation (2), proper magnitudes for the enthalpy of the feed water may be determined in a given reactor operating mode.

The cooling water as much as the steam leaving the reactor pressure vessel in amount is supplied as feed water into the pressure vessel of the reactor. The condenser condenses the steam used in the turbine so that the discharge pressure of the turbine is reduced, thus improving the thermal efficiency of the turbine. The temperature of the condensed water at the outlet of the condenser is almost equal to that of the sea water for cooling the steam. Therefore, the enthalpy of the feed water (condensed water) supplied from the condenser to the reactor pressure vessel cannot be controlled by controlling the flow rate of the feed water of the feed-water heater. Instead, the enthalpy of the feed water can be easily controlled by controlling the flow rate of the steam bled from the turbine and supplied to the feed-water heater, thus adjusting the amount of heat exchange between the steam side and feed water side of the feed-water heater. It is impossible to measure the enthalpy of the feed water directly. Since the feed water is a high-pressure subcooled water with the specific heat thereof approximately 1.0, however, the enthalpy of the feed water may be controlled by controlling the temperature of the feed water which can be measured directly.

Figure 9:
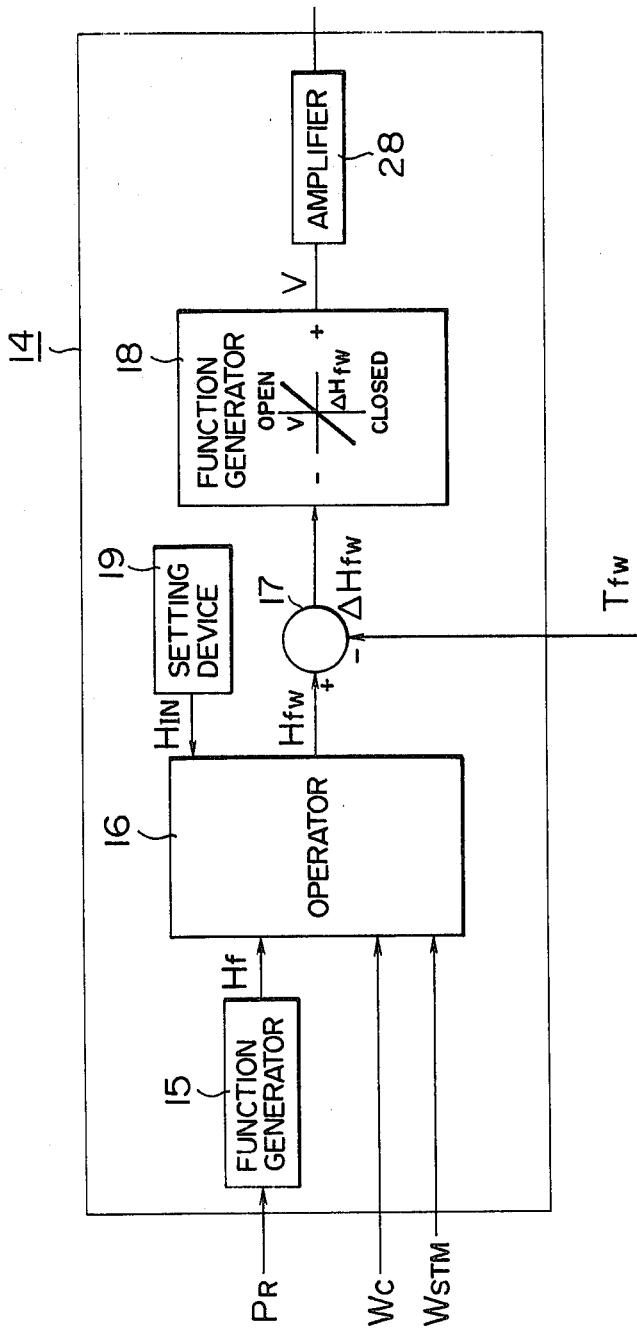
FIG. 9 is a diagram showing in detail a system of the feed-water control included in FIG. 8.

The present invention has been developed on the basis of the above-mentioned result of study. An embodiment of the present invention will be explained below with reference to FIG. 8 showing a system of the boiling water reactor schematically. The reactor core 1 is located within the reactor pressure vessel 2. A plurality of jet pumps 3 are arranged around the core 1 within the reactor pressure vessel 2. An end of the recirculation pipe 4 with the other end thereof connected to the reactor pressure vessel 2 is opposed to the suction port of the jet pumps 3 through the reactor pressure vessel 1. The recirculation pump 5 is mounted on the recirculation pipe 4. The main steam pipe 6 connects the reactor pressure vessel 2 and the turbine 7. The condenser 8 is connected to the steam discharge port of the turbine 7. The feed-water pipe 12 connected to the condenser 8 is connected to the feed water sparger 13 arranged in the reactor pressure vessel 2 through the desalting device 9, the feed-water heater 10 and the feed-water pump 11. The bleeding pipe 38 connected to the turbine 7 is also connected to the feed-water heater 10 through the flow rate adjusting valve 39. The drain pipe 40 connects the feed-water heater 10 and the condensor 8. Numeral 14 shows a feed-water temperature control device, the construction of which is shown in detail in FIG. 9. The feed-water temperature control device comprises a first function generator 15, an operator 16, a heater 17 and a second function generator 18.

When the recirculation pump 5 is driven, the cooling water in the reactor pressure vessel 2 flows through the recirculation pipe 4 and is injected into the suction port of the jet pump 3. The cooling water reaches a position under the core through the jet pump 3 and flows into the core 1. The cooling water, while moving up through the core 1, cools the fuel rods in the fuel assembly arranged at the core 1 to be transformed into steam. The steam passes through a steam separator and a dryer (not shown) and is introduced into the turbine 7 by the main steam pipe 6. The steam discharged from the turbine 7 is condensed by the condenser 8. The cooling water liquefied by condensation is introduced into the desalting device 9, the feed-water heater 10 and the feed-water pump 11 in that order via the feed water pipe 12, and is supplied to the reactor pressure vessel 2 from the feed water sparger 13. The steam bled from the turbine 7 is introduced into the feed-water heater 10 by the bleeding pipe 38. The cooling water (feed water) flowing in the feed water pipe 12 in the feed-water heater 10 is heated by the bled steam. After heating the feed water, the steam is transformed into drain water and is supplied to the condenser 8 through the drain pipe 40.

The operation control of the boiling water reactor according to an embodiment of the invention using the feed-water temperature control device 14 will be explained below. When the reactor starts running, the recirculation pump 5 is driven, and as mentioned above, the cooling water is supplied to the core 1. The flow rate of the cooling water flowing in the core 1 is adjusted to 20%. The control rods inserted into the core 1 are now withdrawn to increase the reactor power. Explanation will be made on a case where the reactor power is 49.1% and the flow rate in the core 1 is 40% as an example. The dome pressure $P_R$ in the reactor pressure vessel 2 is measured by the pressure gauge 24. The dome pressure $P_R$ thus measured is applied to the function generator 15, where it is converted into the enthalpy $H_f$ of the saturated water. In the process of conversion from the dome pressure $P_R$ to the enthalpy of saturated water $H_f$, the steam table may be used. If the dome pressure $P_R$ is in the range from 60 to 75 kg/cm$^2$, however, the dome pressure $P_R$ and the enthalpy $H_f$ of the saturated water have the relation as mentioned below.

$$H_f = 294.8 + 1.244(P_R - 65) \qquad (3)$$

Figure 10:
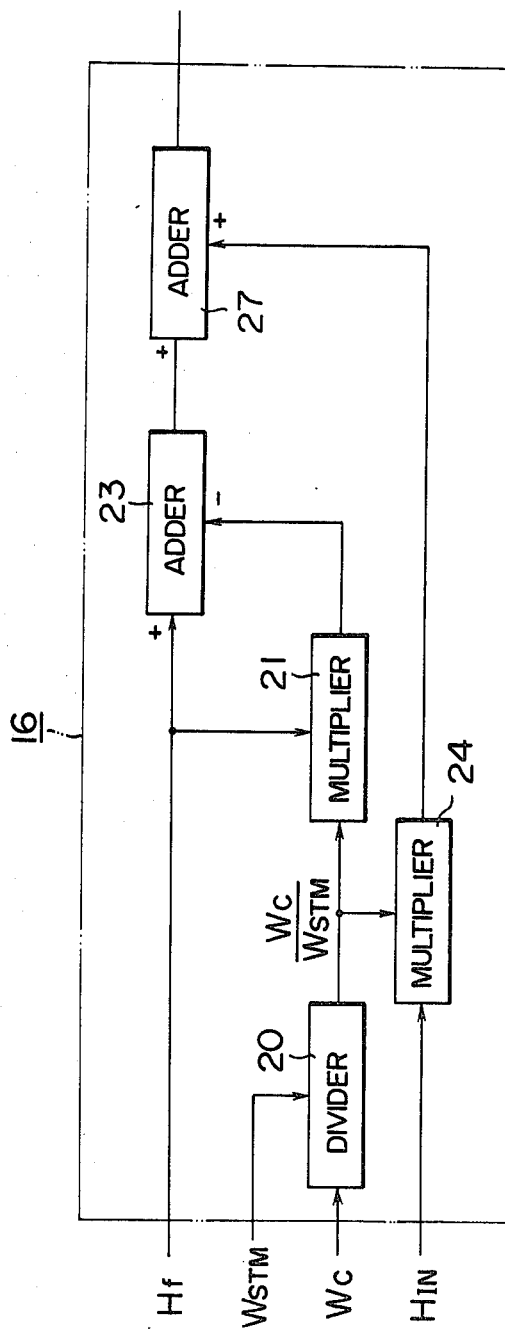
FIG. 10 is a diagram showing the hardware configuration of the operator included in FIG. 9.

In this embodiment, the dome pressure $P_R$ is converted into the enthalpy of saturated water $H_f$ by the function generator 15 on the basis of equation (3) above. The enthalpy $H_f$ of the saturated water is applied to the operator 16. The flow rate $W_c$ of the cooling water flowing in the reactor core 1 is obtained from the flow rate $W_1$ of the cooling water measured by the flowmeter 25 mounted on the jet pumps 3. When there are n jet pumps 3 arranged (n=1, 2, ...), the flow rate $W_c$ of the cooling water is determined as $nW_1$. The flow rate $W_1$ of the cooling water is applied to the multiplier 26 where it is converted into the flow rate of the cooling water $W_c$ (=$nW_1$). The cooling water flow rate $W_c$ is applied to the operator 16. The steam flow rate $W_{STM}$ supplied to the turbine 7 which is measured by the flowmeter 32 mounted on the main steam pipe 6 is applied to the operator 16. The enthalpy $H_{IN}$ at the core inlet which is predetermined by the setting device 19 is also applied to the operator 16. The predetermined enthalpy $H_{IN}$ at the core inlet is always constant. The operator 16 determines the feed-water enthalpy $H_{fw}$ on the basis of equation (2) using the values of the saturated water enthalpy $H_f$, the cooling water flow rate $W_c$, the steam flow rate $W_{STM}$ and the enthalpy $H_{IN}$ at the core inlet. This operation will be explained in detail with reference to FIG. 10.

The divider 20 produces $W_c/W_{STM}$ in response to $W_c$ and $W_{STM}$ applied thereto. $W_c/W_{STM}$ is applied to the multiplier 21, which produces $H_f(W_c/W_{STM})$ in response to the value $H_f$ applied thereto. $H_f$ and $H_f(W_c/W_{STM})$ are applied to the adder 23. The adder 23 produces $H_f(1-W_c/W_{STM})$. The output of the adder 23 is applied to the adder 27. The multiplier 24 is fed with $H_w$ and the output $W_c/W_{STM}$ of the divider 20 and produces $H_{IN}(W_c/W_{STM})$. This output $H_{IN}(W_c/W_{STM})$ is applied to the adder 27, which produces $H_{fw}[=H_f(1-W_c/W_{STM})+H_{IN}(W_c/W_{STM})]$. In this embodiment, the enthalpy $H_{IN}$ at the core inlet predetermined by the setting device 19 is 293 cal/g. Thus, the output $H_{fw}$ of the adder 27 is $H_f(1-W_c/W_{STM})+293(W_c/W_{STM})$. $H_{fw}$ is applied to the adder 17 shown in FIG. 9. Also, the adder 17 is fed with the feed-water temperature $T_{fw}$ measured by the thermometer 35. As mentioned above, the feed water is high pressure subcooling water having a specific heat of almost 1.0, and therefore the value of enthalpy of the feed water may be considered substantially the same as that for the feed-water temperature $T_{fw}$ in spite of some difference from the actual enthalpy. In other words, if the feed-water temperature is 200° C., the feed-water enthalpy is about 200 cal/g. The exact value of the feed-water enthalpy is obtainable by determining the enthalpy of the feed water corresponding to the feed-water temperature with reference to the steam table. However, the thermometer 35 may be considered as a kind of feed-water enthalpy detector means. The adder 17 produces $\Delta H_{fw} (=H_{fw}-T_{fw})$. $\Delta H_{fw}$ is applied to the function generator 18, which in turn produces an output V corresponding to $\Delta H_{fw}$. Specifically, the function generator 18 produces a signal for opening the flow rate adjusting valve 39 when $\Delta H_{fw}$ is positive, and a signal for closing the flow rate adjusting valve 39 when $\Delta H_{fw}$ is negative. The output V of the function generator 18 is amplified by the amplifier 28 and thus boosted to a voltage sufficiently high to start the motor 29 for operating the flow rate adjusting valve 39. The output of the amplifier 28 drives the motor 27, thus operating the flow rate adjusting valve 39. If $\Delta H_{fw}$ is a positive value, for instance, the motor 29 is driven by the output of the amplifier 28 to increase the opening of the flow rate adjusting valve 39. As a result, the amount of steam supplied to the feed-water heater 10 through the bleeding pipe 38 is increased, so that the temperature of the feed water heated by the feed-water heater 10 increases to increase the enthalpy of the feed water. If $\Delta H_{fw}$ is a negative value, on the other hand, the opening of the flow rate adjusting valve 39 is decreased to decrease the amount of steam supplied to the feed water heater 10. The temperature of the feed water decreases, thus reducing the feed-water enthalpy. By changing the flow rate of the steam bled, the amount of heat supplied to the feed water by the steam is adjusted. With a decrease in the amount of steam bled, the amount of heat supplied to the feed water by the steam supplied to the feed-water heater 10 is reduced. In this way, the enthalpy of the feed water is adjusted, thus attaining the enthalpy $H_{IN}$ at the core inlet of about 293 cal/g. The void distribution of the reactor core 1 at the reactor power of 49.1% is as shown by the characteristic curve X in FIG. 7, while the power distribution of the core 1 is as shown by the characteristic curve VIII in FIG. 6.

Figure 11:
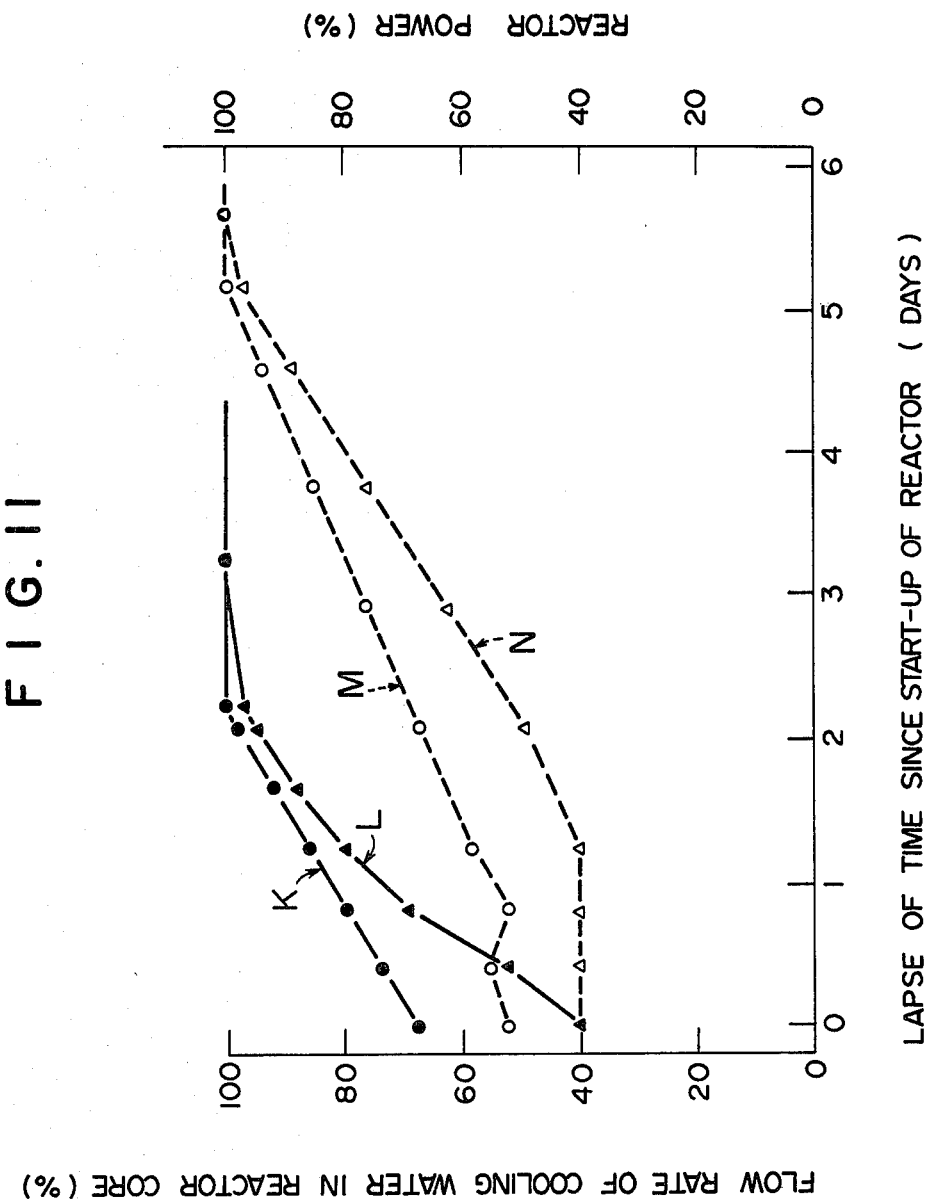
FIG. 11 is a characteristics diagram showing the relation between the lapse of time after reactor start-up, the flow rate of the cooling water in the core and the reactor power.

According to this embodiment, the power distribution can be flattened even under the partial load such as at the time of reactor start-up, thus greatly reducing the linear heat generation rate to 5.8 kg/ft. This enables the power increase rate by the withdrawal of the control rods to be increased. As a result, it is possible to reduce the number of cycles each including increasing the power by the increase of the flow rate of the cooling water, decreasing the power by the decrease of the flow rate of the cooling water, and increasing the power up to point $A_2$ by the withdrawal of the control rods as shown in FIG. 1. This shortens the time required for starting up the reactor, while maintaining the soundness of the fuel rods. At the same time, the process for withdrawing the control rods is simplified. FIG. 11 shows the change with time in the flow rate of the cooling water in the core and the reactor power at the time of start-up according to the present embodiment (with an enthalpy at the core inlet of 293 cal/g) as compared with the conventional methods. In this graph, the abscissa represents the length of time lapsed (in days) since the start-up, and the ordinate the reactor power (in %) and the flow rate of the cooling water in core (in %). The characteristic curves K and L respectively represent the reactor power and the flow rate of the cooling water in the core in the method according to the present embodiment, while the characteristic curves M and N represent the reactor power and the flow rate of the cooling water in the reactor core according to the conventional methods respectively. According to this embodiment, the linear heat generation rate under the partial power state is reduced as mentioned above, and therefore the time required for withdrawal of the control rods is negligibly small as compared with the time in the conventional methods. Also, since the power distribution is constant for each operating condition according to the embodiment under consideration, the gradient of power increase due to the increase in the flow rate of the cooling water in the core can be made so large that it takes 2.25 days to achieve the rated power. According to the conventional methods, in contrast, it takes 1.25 days to increase the power by withdrawing the control rods, and 3.92 days to increase the power by increasing the flow rate of the cooling water at the core, so that it takes 5.17 days in total until the rated power is achieved. According to this embodiment, the rated power is achieved within half the time required in the conventional methods, thus greatly contributing to an improved utility of the boiling water reactor plant.

Further, by the use of the operation control method according to this invention, the power distribution under various operating conditions is flattened, thus flattening the axial distribution of the xenon concentration. This in turn contributes to safe operation by maintaining the soundness of the fuel rods even in case of power variations such as at the time of the load follow-up control operation. Further, the increase in the average void fraction in the reactor core at the time when the flow rate of the cooling water is low causes the reactor power to decrease, so that it is possible to increase the allowable power variation range as compared with the conventional methods, thus increasing the versatility of the power-variable operation. The function of the feed-water temperature control device 14 may alternatively be performed by a computer. The opening of the flow rate adjusting valve 39 may be controlled in accordance with the value of $H_{fw}$ without obtaining the error between $H_{fw}$ and $T_{fw}$ by the adder 17.

Next, the heat balance of the feed-water heater 10 mentioned above will be explained. The diagram of FIG. 12 schematically shows the system built around the feed-water heater 10. The steam bled from the turbine 7 is supplied through the bleeding pipe 38 to the feed-water heater 10. The heat balance of the feed-water heater 10 is given by the equation below:

$$G_x(i_x - i_D) = G_w(i_2 - i_1) \quad (4)$$

where $G_x$ is the enthalpy (cal/g) of the steam bled, $i_D$ the enthalpy (cal/g) of the drain water, $G_w$ the flow rate of the feed water (t/h), $i_1$ the enthalpy (cal/g) of the feed water at the inlet of the feed-water heater, and $i_2$ the enthalpy (cal/g) of the feed water at the outlet of the feed-water heater.

The right side of equation (4) represents the amount of heat exchange at the steam side of the feed-water heater 10 and the left side the amount of heat exchange at the feed-water side thereof. If this equation is solved in respect of the enthalpy $i_2$ of the feed water at the outlet of the feed-water heater 10, the equation below is obtained.

$$i_2 = i_1 + \frac{G_x}{G_w}(i_x - i_D) \quad (5)$$

As obvious from equation (5), with an increase in the amount $G_x$ of the steam bled, the enthalpy $i_2$ of the feed water at the outlet of the feed-water heater 10 increases.

In view of the fact that the feed-water heater 10 of the boiling water reactor is not provided with a superheating section, the enthalpy $i_2$ of the feed water at the outlet of the feed-water heater 10 cannot exceed the saturation enthalpy $i_y$ for the pressure $P_y$ in the feed-water heater 10. Therefore, taking into consideration the pressure drop in the bleeding pipe 38, the pressure $P_y$ in the feed-water heater 10 is given as $$P_y = 0.92 P_x \quad (6)$$

where $P_x$ denotes the turbine bleeding pressure. This turbine bleeding pressure is reduced as the turbine stage procedes in the turbine 7. When the reactor is running at a power of 50%, for instance, the turbine bleeding pressure is about 30 kg/cm$^2$·a if bled at the first stage of the high pressure turbine, and about 16 kg/cm$^2$·a if bled at the fourth stage. When the reactor is running at the rated power, on the other hand, the turbine bleeding pressure is about 52 kg/cm$^2$·a if bled at the first stage of the high pressure turbine and about 26 kg/cm$^2$·a if bled at the fourth stage of the turbine. The enthalpy of the saturated steam at various bleeding pressures is shown in Table 2 below.

TABLE 2

| Pressure (kg/cm$^2$ · a) | Enthalpy of saturated steam (kcal/kg) |
|---|---|
| 16 | 204 |

TABLE 2-continued

| Pressure (kg/cm$^2$ · a) | Enthalpy of saturated steam (kcal/kg) |
|---|---|
| 26 | 231 |
| 30 | 240 |
| 52 | 274 |

Under this condition, if the feed-water enthalpy is controlled in such a manner that the enthalpy at the inlet of the reactor core under a partial power state becomes the same as under the rated power state, the feed-water enthalpy of about 230 kcal/kg is attained for the reactor power of 50% and about 220 kcal/kg for the reactor power of 100%. Therefore, if the feed-water enthalpy of about 230 kcal/kg is to be achieved under a partial power state, the bleeding pressure of more than 30 kg/cm$^2$·a must be attained in consideration of the pressure drop at the bleeding pipe 38, or in other words, the bleeding is necessary from the first stage of the high pressure turbine. With an increase in power, however, the bleeding pressure at the first stage increases, and reaches about 52 kg/cm$^2$·a at the rated power as described above. Therefore, if the bleeding is effected from the first stage, the enthalpy of the saturated steam in the feed-water heater 10 and the feed water enthalpy have a very small difference for the reactor power of 50%, while the enthalpy of the saturated steam in the feed water heater 10 is larger by about 55 kcal/kg than the feed water enthalpy for the reactor power of 100%. In other words, in the case where as in the preceding embodiment the feed-water temperature (feed-water enthalpy) is controlled only by the bleeding of steam, the temperature difference in the bleeding pipe 38 increases with the increase in reactor power, with a result that the temperature at the steam side exceeds the temperature at the feed-water side by about 50° C. This causes a great difference in the axial temperature distribution of the feed-water heater 10, thus applying a thermal stress to the heat transmission tube of the feed-water heater 10 in which the feed water is flowing.

Figure 13:
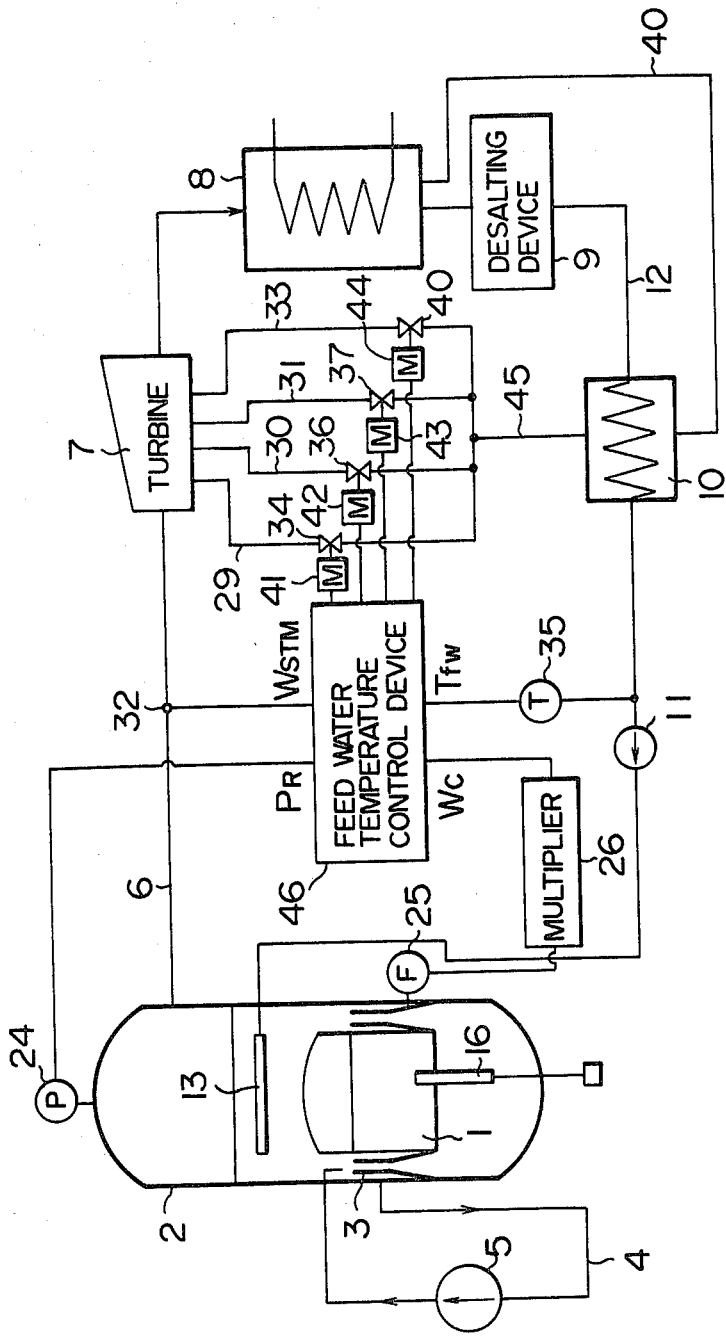
FIG. 13 is a diagram showing the boiling water reactor plant system to which another embodiment of the present invention is applied.
Figure 14:
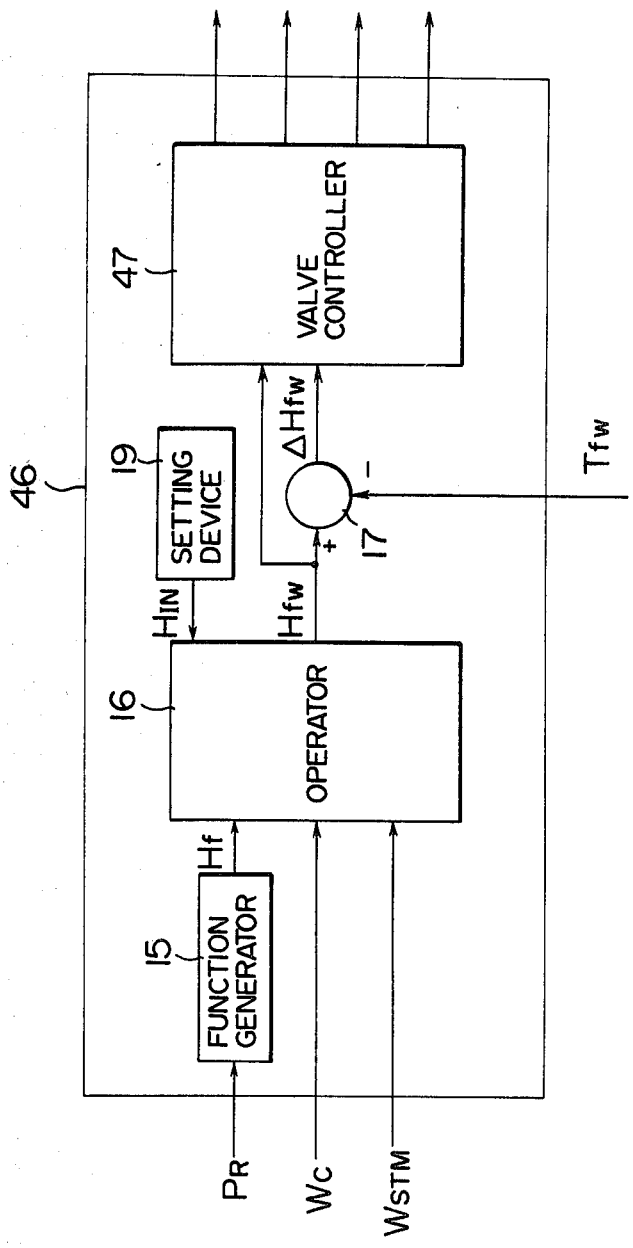
FIG. 14 is a system diagram showing in detail the feed-water temperature control included in FIG. 13.

An embodiment of the present invention which obviates the abovementioned problem will be explained with reference to FIGS. 13 to 15. Component elements similar to those in the preceding embodiment are shown by same reference numerals in FIGS. 13 and 14, and only those component elements different from those the preceding embodiment will be described. The turbine 7 has a six-stage blade structure. The turbine casing containing the blades at the first, second, third and fourth stages from the upstream side is connected with the bleeding pipes 29, 30, 31 and 33. The bleeding valves 34, 36, 37 and 40 are mounted on respective bleeding pipes. Motors 41, 42, 43 and 44 for operating the valves are arranged on the respective bleeding valves. The bleeding pipes 29, 30, 31 and 33 are connected to the pipe 45 leading to the feed-water heater 10. The feed-water temperature control device 46 comprises a function generator 15, an operator 16, an adder 17 and a valve controller 47.

As in the preceding embodiment, the enthalpy $H_f$ of the saturated water, the cooling water flow rate $W_c$, the steam flow rate $W_{STM}$ and the predetermined enthalpy $H_{IN}$ at the core inlet are applied to the operator 16 which produces $H_{fw}$. The adder 17 produces $\Delta H_{fw}$ ($= H_{fw} - T_{fw}$) in response to the feed-water temperature $T_{fw}$ measured by the thermometer 35 and $H_{fw}$ applied thereto. $H_{fw}$ and $\Delta H_{fw}$ are applied to the valve controller 47.

The comparators 49, 50, 51 and 52 in the valve controller 47 produce an output signal in response to a positive voltage or zero voltage. The bias voltages $a_1$, $a_2$, $a_3$ and $a_4$ have the relation $a_1 > a_2 > a_3 > a_4$. The output $H_{fw}$ of the operator 16 and the output $\Delta H_{fw}$ of the adder 17 are applied to the adder 48 in the valve controller 47. The adder 48 produces an enthalpy signal $E_n$. If $E_n \geq a_1$, outputs are produced from the comparators 49, 50, 51 and 52, although the relay A is actuated and the normally-closed contacts $A_b$ opens, so that the relays B, C and D fail to be actuated. As a result, the motor 41 connected to the relay A is driven, thus opening the bleeding valve 34. The bleeding valves 42, 43 and 44 remain closed. The steam bled from the first stage of the turbine 7 is supplied through the bleeding pipe 29 to the feed water heater 10 thereby to heat the feed water. If the reactor power is low at the time of starting up the boiling water reactor plant, the value $T_{fw}$ is low, so that the value $\Delta H_{fw}$ is high, resulting in high value of $E_n$. The result is that $E_n$ is larger than $a_1$, thus opening the bleeding valve 42 as mentioned above. With the increase in reactor power, the enthalpy of the saturated steam increases, so that the temperature of the feed water heated by the feed-water heater 10 increases. The value $\Delta H_{fw}$ is now decreased, and so is the value $E_n$. If $a_1 > E_n > a_2$, no output is produced from the comparator 49, and the relay A fails to be actuated, although each of the comparators 50, 51 and 52 produces an output. In response to the output of the comparator 50, the relay B is energized, thus opening the normally-closed contact $B_b$. The relays C and D thus fail to be actuated. The actuation of the relay B drives the motor 42, thus opening the bleeding valve 36. The bleeding valves 34, 37 and 40 remain closed. The steam bled from the second stage of the turbine 7 is supplied through the bleeding pipe 31 to the feed-water heater 10. With the further increase in reactor power, the value $E_n$ further decreases. If $a_2 > E_n \geq a_3$, on the other hand, no output is produced from the comparator 49 or 50, nor is actuated the relays A and B. Although the comparators 51 and 52 produce outputs, the actuation of the relay C opens the normally-closed contact $C_b$. Thus, the relay D fails to be actuated. With the actuation of relay C, the motor 43 is driven, thus opening the bleeding valve 37, while the bleeding valve 34, 36 and 40 remain closed. The steam bled from the third stage of the turbine 7 is supplied through the bleeding pipe 31 to the feed-water heater 10. When the reactor power reaches the rating (100% power), the value $E_n$ takes a minimum. If $a_3 - E$, $\geq a_4$, by contrast, the value $\geq a_4$, by contrast, the comparators 49, 50 and 51 fail to produce outputs, so that the relays A, B and C fail to be energized. An output is produced from only the comparator 52, thus actuating the relay D. Upon actuation of the relay D, the motor 44 is driven, thus opening the bleeding valve 40, while the bleeding valves 34, 36 and 37 remain closed. The steam bled from the fourth stage of the turbine 7 is supplied through the bleeding pipe 33 to the feed-water heater 10. The position of bleeding steam is changed from the first to the fourth stage of the turbine 7 in accordance with the reactor power, thus reducing the temperature of the steam bled in accordance with the reactor power. In this way, the heat amount supplied to the feed water by the supplied steam is reduced with the increase in reactor power.

According to this embodiment, as in the preceding embodiment, the enthalpy at the core inlet under partial power state is increased, thus flattening the power distribution at the core. Thus the time required to reach the rated power at the time of starting up the reactor is greatly shortened. Further, the advantages mentioned below over the preceding embodiment are obtained.

According to the present embodiment, the bleeding pipes are sequentially switched in accordance with the change in the reactor power thereby to bleed steam from the turbine 17. Therefore, the difference between the temperature at the steam side and the temperature at feed-water side in the feed water heater 10 is maintained always small against the change in reactor power, thus decreasing the thermal stress on the heat transmission tube of the feed-water heater 10. Also, steam is bled from the later stage, i.e., the fourth stage of the turbine under rated power state of the reactor, thus preventing the turbine efficiency from being reduced under the rated power state. By the way, the function of the feed-water temperature control device 46 may alternatively be performed by a computer.

According to the present invention, the time required to increase the power of the boiling water reactor plant to a predetermined maximum level is reduced, thus improving the utility of the biling water reactor.

We claim:

1. A system for controlling the operation of a boiling water reactor, comprising first detector means for detecting the pressure in the reactor vessel, second detector means for detecting the flow rate of the cooling water flowing in the core in the reactor vessel, third detector means for detecting the flow rate of the steam supplied to a turbine from said reactor vessel, means for setting the enthalpy of said cooling water at the inlet of said core at a value in dependence on the reactor power, said set value rendering the void fraction in the lower part of the core when the reactor power is less than a predetermined maximum value to be greater than the void fraction in the lower part of the core when the reactor power is at the predetermined maximum value so as to flatten the power distribution in the axial direction of the core when the reactor power is less than the predetermined maximum value, means for adjusting the enthalpy of the feed water supplied to said reactor vessel, and means for controlling said feed water enthalpy adjusting means on the basis of said pressure, said cooling water flow rate and said steam flow rate detected by said first, second and third detector means respectively and said cooling water enthalpy set by said setting means, thereby effecting a start-up of the reactor.

2. A system for controlling the operation of the boiling water reactor according to Claim 1, further comprising means for converting the pressure to the enthalpy of the saturated water, said feed water enthalpy being adjusted on the basis of the enthalpy of the saturated water corresponding to said pressure detected by said first detector means, said cooling water flow rate and said steam flow rate detected by said second and third detector means respectively and said cooling water enthalpy set by said setting means, said saturated water enthalpy being obtained from said converter means.

3. A system for controlling the operation of the boiling water reactor according to claim 1, wherein said feed water enthalpy adjusting means includes means for adjusting the amount of heat supplied to said feed water from the steam bled from said turbine, said heat amount adjusting means being controlled on the basis of said pressure, said cooling water flow rate, said steam flow rate and said cooling water enthalpy.

4. A system for controlling the operation of the boiling water reactor according to claim 3, further comprising means for converting the pressure into the enthalpy of the saturated water, said heat amount adjusting means being controlled on the basis of said cooling water flow rate, said steam flow rate, said cooling water enthalpy, and the standard water enthalpy obtained from said converter means and corresponding to said pressure detected by said first detector means.

5. A system for controlling the operation of the boiling water reactor according to claim 3, wherein said heat amount adjusting means includes means for adjusting the flow rate of the steam bled and introduced to heat exchange means for heating said feed water, and means is provided for controlling said steam flow rate adjusting means on the basis of said pressure, said cooling water flow rate, said steam flow rate and said cooling water enthalpy.

6. A system for controlling the operation of the boiling water reactor according to claim 5, further comprising means for converting the pressure into the saturated water enthalpy, and means for controlling said steam flow rate adjusting means on the basis of the enthalpy of the saturated water corresponding to said pressure detected by said first detector means, said enthalpy being obtained from said converter means.

7. A system for controlling the operation of the boiling water reactor according to claim 6, further comprising means for determining a target of said feed water enthalpy on the basis of said cooling water flow rate, said steam flow rate, said cooling water enthalpy and said saturated water enthalpy, said heat amount adjusting means being controlled on the basis of said feed water enthalpy.

8. A system for controlling the operation of the boiling water reactor according to claim 7, further comprising means for measuring said feed water enthalpy to determine an error between said target of the feed water enthalpy and the measurement of said feed water enthalpy, and means for controlling said steam flow rate adjusting means according to said error.

9. A system for controlling the operation of the boiling water reactor according to claim 5, 6, 7 or 8, wherein said steam flow rate is reduced by said steam flow rate adjusting means according as the reactor power increases from a first level up to a second predetermined maximum level.

10. A system for controlling the operation of the boiling water reactor according to claim 3, wherein said heat amount adjusting means changes the position of bleeding the steam from said turbine, said feed water enthalpy being measured, said bleeding position changing means being controlled by control means on the basis of said pressure, said cooling water flow rate, said cooling water enthalpy and said feed water enthalpy.

11. A system for controlling the operation of the boiling water reactor according to claim 10, further comprising means for converting the pressure to the enthalpy of the saturated water, means for determining a target of said feed water enthalpy on the basis of said cooling water flow rate, said steam flow rate, said cooling water enthalpy and said saturated water enthalpy obtained from said converter means and corresponding to the pressure detected by said first detector means, means for determining the error between said target and the measurement of said feed water enthalpy, and means for controlling said bleeding position changing means on the basis of said target and said error.

12. A system for controlling the operation of the boiling water reactor according to claim 10 or 11, wherein said steam-bleeding position is changed from upstream toward downstream of said turbine by said bleeding position changing means according as the reactor power increases from a first level up to a second predetermined maximum level.

13. A system for controlling the operation of the boiling water reactor, comprising a reactor vessel, a turbine supplied with the steam produced by said reactor vessel, means for supplying the feed water to said reactor vessel, means for heating said feed water to control the void fraction in the lower part of the core so as to flatten the power distribution in the axial direction of the core, and means for controlling the amount of heat supplied from said feed water heating means to said feed water, said heat amount control means reducing the amount of heat applied to said feed water according as the reactor power increases from a first level up to a second predetermined maximum level to flatten the power distribution in the axial direction of the core.

14. A system for controlling the operation of the boiling water reactor according to claim 13, wherein said feed water heating means is heat exchange means supplied with said feed water, said heat amount control means includes means for adjusting the flow rate of the steam bled from said turbine and introduced to said heat exchange means, said steam flow rate adjusting means reducing the flow rate of said steam according as the reactor power increases from the first level up to the second predetermined maximum level.

15. A system for controlling the operation of the boiling water reactor according to claim 13, wherein said feed water heating means is heat exchange means supplied with said feed water, said heat amount control means changing the bleeding position of the steam bled from said turbine, said steam bleeding position changing means changing the steam bleeding position from upstream toward downstream of said turbine according as said reactor power increases from the first level up to the second predetermined maximum level.

16. A method of controlling the operation of the boiling water reactor, comprising:
  detecting the pressure in the reactor pressure vessel;
  detecting the flow rate of cooling water in the reactor core within said reactor pressure vessel;
  detecting the flow rate of steam supplied from said reactor pressure vessel to a turbine generator;
  setting the enthalpy of said cooling water at the core inlet at a value in dependence on the reactor power, said set value rendering the void fraction in the lower part of the core when the reactor power is less than a predetermined maximum value to be greater than the void fraction in the lower part of the core when the reactor power is at the predetermined maximum value so as to flatten the power distribution in the axial direction of the core when the reactor power is less than the predetermined maximum value, and
  controlling the enthalpy of feed water to be supplied to said reactor pressure vessel in accordance with values of said detected vessel pressure, cooling water flow rate and steam flow rate and said set enthalpy of said cooling water.

17. A method of controlling the operation of a boiling water reactor for effecting a rapid start-up of the reactor, comprising the steps of:

(1) extracting a control rod to raise the power of the reactor;

(2) increasing the flow rate of a coolant in the core of the reactor to raise the power of the reactor with the said extraction of the control rod being stopped;

(3) decreasing the flow rate of the coolant in the reactor core to lower the reactor power;

(4) repeating the steps (1), (2) and (3) in the described order to raise the reactor power; and (5) decreasing the enthalpy of the coolant at the core inlet of the reactor as the reactor power is increased so as to control the void fraction in the lower part of the core and flatten the power distribution in the axial direction of the core.

18. A system for controlling the operation of a nuclear reactor having a reactor vessel and a core, comprising first detector means for detecting the pressure in the reactor vessel and for providing a first output signal indicative thereof, second detector means for detecting the flow rate of cooling water flowing in the core of the reactor vessel and for providing a second output signal indicative thereof, third detector means for detecting the flow rate of steam supplied from the reactor vessel to a turbine and for providing a third output signal indicative thereof, means for setting a value of the enthalpy of the cooling water at the inlet of said core in dependence on reactor power and for providing a set output signal indicative thereof, said set value rendering the void fraction in the lower part of the core when the reactor power is less than a predetermined maximum value to be greater than the void fraction in the lower part of the core when the reactor power is at the predetermined maximum value so as to flatten the power distribution in the axial direction of the core when the reactor power is less than the predetermined maximum value, means for adjusting the enthalpy of the feed water supplied to the reactor vessel, and means for controlling the feed water enthalpy adjusting means in response to the set output signal and said first, second and third output signals.

19. A system for controlling the operation of a nuclear reactor according to claim 18, wherein said controlling means adjusts said adjusting means in accordance with the formula $$H_{fw} = H_f(1 - W_c/W_{STM}) + H_{IN}(W_c/W_{STM})$$

wherein $H_{fw}$ is a signal representing the enthalpy of the feed water to be adjusted in cal/g; $H_f$ is the first output signal representing the enthalpy of saturated cooling water in cal/g; $W_c$ is the second output signal representing the flow rate of cooling water in the core in t/h; $W_{STM}$ is the third output signal representative of the steam flow rate supplied to the turbine in t/h; and $H_{IN}$ is the set output signal indicating the value of enthalpy set for the cooling water at the inlet of the core in cal/g.

20. A system for controlling the operation of a nuclear reactor according to claim 18 or 19, wherein the feed water enthalpy adjusting means adjusts the amount of steam bled from the turbine to a feed water heater through which the feed water is supplied to the reactor vessel.

21. A system for controlling the operation of a nuclear reactor according to claim 18 or 19, wherein said first detecting means includes a pressure detector for detecting the pressure in the reactor vessel and providing a pressure output signal and means for converting the pressure output signal to the first output signal which is indicative of the enthalpy of the saturated water.

22. A system for controlling the operation of a nuclear reactor according to claim 18 or 19, wherein the nuclear reactor is a boiling water reactor, and said controlling means adjusts said feed water enthalpy adjusting means in accordance with the heat balance of the boiling water reactor, the value of enthalpy set by said setting means being in cal/g.

* * * * *